US012020565B2

(12) United States Patent
Althoff et al.

(10) Patent No.: US 12,020,565 B2
(45) Date of Patent: Jun. 25, 2024

(54) DRIVING SYSTEM AND METHOD FOR SELECTING AN ACTION OPTION FOR AN AUTOMATED MOTOR VEHICLE

(71) Applicant: Bayerische Motoren Werke Aktiengesellschaft, Munich (DE)

(72) Inventors: Daniel Althoff, Munich (DE); Constantin Hubmann, Munich (DE); Nils Quetschlich, Munich (DE); Jens Schulz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 413 days.

(21) Appl. No.: 17/593,911

(22) PCT Filed: Oct. 25, 2019

(86) PCT No.: PCT/EP2019/079165
§ 371 (c)(1),
(2) Date: Sep. 28, 2021

(87) PCT Pub. No.: WO2020/200500
PCT Pub. Date: Oct. 8, 2020

(65) Prior Publication Data
US 2022/0172608 A1 Jun. 2, 2022

(30) Foreign Application Priority Data
Mar. 29, 2019 (DE) ...................... 10 2019 108 142.4

(51) Int. Cl.
*B60W 30/095* (2012.01)
*G08G 1/01* (2006.01)
(52) U.S. Cl.
CPC ......... *G08G 1/0133* (2013.01); *B60W 30/095* (2013.01); *G08G 1/0141* (2013.01);
(Continued)

(58) Field of Classification Search
CPC . B60R 1/00; B60R 21/0134; B60R 2300/302; B60R 2300/307; B60W 30/08;
(Continued)

(56) References Cited

U.S. PATENT DOCUMENTS 11,024,175 B2* 6/2021 Zhang ................... G05D 1/028
11,505,181 B2* 11/2022 Vladimerou .... B60W 30/18154
(Continued)

FOREIGN PATENT DOCUMENTS

CN            102598083 A    7/2012
DE     10 2005 051 805 B3    5/2007
(Continued)

OTHER PUBLICATIONS

Chinese-language Office Action issued in Chinese Application No. 201980094713.X dated Nov. 17, 2023 (7 pages).
(Continued)

*Primary Examiner* — Peter D Nolan
*Assistant Examiner* — Ce Li Li
(74) *Attorney, Agent, or Firm* — Crowell & Moring LLP (57) ABSTRACT

A driving system for the automated driving for a motor vehicle is configured to determine a field of vision of at least one sensor of the motor vehicle, for at least one area in the surroundings of the motor vehicle which does not lie in the field of vision of the at least one sensor, to simulate, if appropriate, a virtual road user in the at least one area in the surroundings of the motor vehicle, to carry out an evaluation of action options in accordance with a possible virtual collision of the motor vehicle with the at least one virtual road user, to select one of these action options in accordance with the above, and to execute the selected action option.

10 Claims, 4 Drawing Sheets

(52) U.S. Cl.
CPC ... *G08G 1/0145* (2013.01); *B60W 2554/4041* (2020.02); *B60W 2554/4048* (2020.02)

(58) Field of Classification Search
CPC ............... B60W 30/09; B60W 30/095; B60W 30/0956; B60W 30/146; B60W 30/18154; B60W 40/04; B60W 50/12; B60W 50/14; B60W 50/16; B60W 60/0027; B60W 2050/143; B60W 2050/146; B60W 2520/10; B60W 2540/20; B60W 2552/00; B60W 2552/05; B60W 2552/15; B60W 2552/30; B60W 2554/00; B60W 2554/20; B60W 2554/40; B60W 2554/4026; B60W 2554/4029; B60W 2554/4041; B60W 2554/4048; B60W 2554/80; B60W 2555/02; B60W 2555/60; B60W 2556/20; B60W 2556/40; B60W 2556/50; B60W 2556/65; B60W 2710/182; G01C 21/30; G01C 21/32; G05D 1/0214; G05D 1/0223; G05D 1/024; G05D 1/0246; G05D 1/0248; G05D 1/027; G05D 1/0274; G05D 1/0278; G06V 20/56; G06V 20/58; G06V 20/582; G06V 20/584; G06V 20/588; G08G 1/0133; G08G 1/0141; G08G 1/0145; G08G 1/16; G08G 1/163; G08G 1/166

See application file for complete search history.

(56) References Cited

U.S. PATENT DOCUMENTS

| | | | | |
|---|---|---|---|---|
| 2012/0218093 | A1* | 8/2012 | Yoshizawa | B60R 21/0134 340/435 |
| 2012/0316725 | A1* | 12/2012 | Trepagnier | G01S 17/931 701/26 |
| 2014/0180568 | A1 | 6/2014 | Nagata | |
| 2016/0148510 | A1 | 5/2016 | Vanholme | |
| 2016/0232418 | A1* | 8/2016 | Inoshita | G06V 10/44 |
| 2019/0071082 | A1 | 3/2019 | Prasad | |
| 2022/0013008 | A1* | 1/2022 | Katz | H04W 4/029 |

FOREIGN PATENT DOCUMENTS

| | | |
|---|---|---|
| DE | 10 2013 215 098 A1 | 2/2015 |
| DE | 10 2017 206 862 A1 | 10/2018 |
| EP | 2 495 713 A1 | 9/2012 |
| EP | 3 091 370 A1 | 11/2016 |
| EP | 3 361 466 A1 | 8/2018 |
| JP | 2006-260217 A | 9/2006 |
| JP | 2011-96105 A | 5/2011 |
| JP | 2011-248870 A | 12/2011 |
| JP | 2016-122308 A | 7/2016 |

OTHER PUBLICATIONS

International Search Report (PCT/ISA/210) issued in PCT Application No. PCT/EP2019/079165 dated Mar. 16, 2019 with English translation (four (4) pages).

German-language Written Opinion (PCT/ISA/237) issued in PCT Application No. PCT/EP2019/079165 dated Mar. 16, 2019 (six (6) pages).

German-language Search Report issued in German Application No. 10 2019 108 142.4 dated Sep. 23, 2019 with partial English translation (13 pages).

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

Japanese-language Office Action issued in Japanese Application No. 2021-556331 dated Jun. 21, 2023 with English translation (7 pages).

* cited by examiner

DRIVING SYSTEM AND METHOD FOR SELECTING AN ACTION OPTION FOR AN AUTOMATED MOTOR VEHICLE

BACKGROUND AND SUMMARY OF THE INVENTION

The invention relates to a driving system and a method for automated driving for a motor vehicle.

The term "automated driving" can be understood in the scope of the document as driving having automated longitudinal or lateral control or autonomous driving having automated longitudinal and lateral control. The term "automated driving" comprises automated driving having an arbitrary degree of automation. Exemplary degrees of automation are assisted, partially automated, highly automated, or fully automated driving. These degrees of automation were defined by the Bundesanstalt für Straßenwesen [German Federal Highway Research Institute] (BASt) (see BASt publication "Forschung kompakt [compact research]", edition November 2012). In assisted driving, the driver continuously executes the longitudinal or lateral control, while the system takes over the respective other function in certain limits. In partially automated driving (TAF), the system takes over the longitudinal and lateral control for a certain period of time and/or in specific situations, wherein the driver has to continuously monitor the system as in assisted driving. In highly automated driving (HAF), the system takes over the longitudinal and lateral control for a certain period of time without the driver having to continuously monitor the system; however, the driver has to be capable of taking over the vehicle control in a certain time. In fully automated driving (VAF), the system can automatically manage the driving in all situations for a specific application; a driver is no longer necessary for this application. The above-mentioned four degrees of automation according to the definition of the BASt correspond to the SAE levels 1 to 4 of the standard SAE J3016 (SAE—Society of Automotive Engineering). For example, highly automated driving (HAF) according to the BASt corresponds to level 3 of the standard SAE J3016. Furthermore, the SAE level 5 is also provided as the highest degree of automation in SAE J3016, which is not included in the definition of the BASt. The SAE level 5 corresponds to driverless driving, in which the system can automatically manage all situations like a human driver during the entire journey; a driver is generally no longer required.

Methods for automated driving for motor vehicles are known. These methods are based on the motor vehicle acquiring its surroundings by use of sensors and the motor vehicle being controlled as a function of the acquired sensor data.

However, regions in the surroundings of the motor vehicles can be not visible to the sensors, for example because these regions are concealed by obstacles.

These concealed regions are a problem for the automated vehicle control, since it cannot be decided unambiguously whether another road user is located there, who is possibly relevant for the vehicle control.

It is the object of the invention to specify an improved approach for selecting an action option for an automated motor vehicle, in the surroundings of which regions not visible to the sensors of the motor vehicle are located.

The object is achieved by the claimed invention.

A first aspect of the invention relates to a driving system for automated driving for a motor vehicle.

The driving system is configured to acquire an actual traffic situation in the surroundings of the motor vehicle.

In particular, the actual traffic situation comprises, in addition to the ego motor vehicle, at least one further road user.

The actual traffic situation can in particular comprise an item of spatial information, which relates to the ego motor vehicle, the road user, and/or the traffic infrastructure. This can be, for example, a position and/or an orientation of the ego motor vehicle or the road user.

Alternatively or additionally, the actual traffic situation can in particular also comprise an item of dynamic information about the state of the road user or the traffic infrastructure. This can be, for example, an activation state of a direction indicator of the road user or the present state of a traffic signal as traffic infrastructure.

The acquisition of the actual traffic situation can be carried out in particular by means of sensors of the motor vehicle, for example at least by use of a camera, a laser scanner, and/or an ultrasonic sensor.

The road user can be in particular a motor vehicle, a bicyclist, a pedestrian, or any arbitrary other road user.

The driving system is additionally configured to determine an actual field of view of at least one sensor of the motor vehicle in the actual traffic situation.

The field of view of the at least one sensor fundamentally results from the design of the sensor and is restricted by objects in the surroundings of the motor vehicle. For example, static or stationary objects in the surroundings of the motor vehicle, for example roadside structures adjacent to the roadway or traffic infrastructure, can restrict the field of view.

Alternatively or additionally, dynamic objects, for example other road users, can restrict the field of view.

The driving system is configured, for at least one region in the surroundings of the motor vehicle, which is not in the actual field of view of the at least one sensor, for example because the region is concealed by a static or dynamic object in the surroundings of the motor vehicle, to simulate a virtual road user in the at least one region in the surroundings of the motor vehicle as a function of a probability of appearance for the virtual road user.

The virtual road user is thus assumed with a certain probability in the at least one region.

The driving system is additionally configured to use at least two alternative action options relating to the longitudinal and/or lateral control of the ego motor vehicle starting from the actual traffic situation for a first time step.

The action options can be in particular action options which change the velocity of the motor vehicle and, for example, increase or decrease the velocity of the motor vehicle.

Alternatively or additionally, the action options can also be action options which do not change the velocity of the motor vehicle.

Alternatively or additionally, the action options can be action options which change the lateral alignment of the motor vehicle in the driving lane.

The action options describe in particular options for influencing the longitudinal control of the motor vehicle, which the motor vehicle can execute in the actual traffic situation. For example, the action options of the motor vehicle are limited by the drive power of the motor vehicle and by the rules of physics.

The action options can be selected in particular from a set of predefined action options and can be parameterized, for example. Alternatively or additionally, the action options can also be freely ascertained without having been previously defined.

In particular, the number of the action options is countably limited. For example, the driving system is configured to use fewer than 10, fewer than 25, or fewer than 50 action options.

For each of these action options, at least one possible future traffic situation is determined for the first time step as a consequence of the respective action option.

A possible future traffic situation can be in particular a hypothetical traffic situation not yet actually existing at the present point in time. This can in particular comprise, comparably to the actual traffic situation, an item of spatial information about the ego motor vehicle, the road user, and/or the traffic infrastructure.

Alternatively or additionally, the possible future traffic situation can also comprise an item of dynamic information about the state of the road user or the traffic infrastructure.

A possible future traffic situation for the first time step can in particular be derived from the actual traffic situation by application of a random method. For this purpose, for example, the spatial position of a selected road user in a possible future traffic situation can be ascertained for the first time step by use of a random vector starting from the spatial position of the selected road user in the actual traffic situation.

In one possible future traffic situation for the first time step, in particular the spatial position of the ego motor vehicle can be determined in such a way that starting from the spatial position of the ego motor vehicle in the actual traffic situation, an execution of an action option relating to the longitudinal control of the ego motor vehicle is assumed.

The driving system is additionally configured to determine the spatial position of the at least one virtual road user in each possible future traffic situation in such a way that the at least one virtual road user moves starting from the spatial position of the at least one virtual road user in the actual traffic situation.

For each of these possible future traffic situations, an assessment is performed as a function of a possible virtual collision of the ego motor vehicle with the at least one virtual road user, wherein the assessment in particular comprises an assessment of the hazard potential and/or an assessment of the driving comfort of the ego motor vehicle.

One of the action options relating to the longitudinal control of the ego motor vehicle is selected as a function thereof for the first time step. In this case, in particular the action option can be selected, the associated traffic situations of which display the lowest possible hazard potential and/or the highest possible driving comfort of the ego motor vehicle.

The selected action option relating to the longitudinal control of the ego motor vehicle is thereupon executed.

The driving system is in particular configured to perform an assessment for each of these possible future traffic situations by determining at least one cost value related to the respective possible future traffic situation.

The cost value can be ascertained in particular as a function of the spatial position or orientation of the ego motor vehicle and/or a further road user.

Alternatively or additionally, the cost value can in particular also be ascertained as a function of the spatial relationship of the ego motor vehicle, at least one road user, and/or at least one object of the traffic infrastructure in relation to one another. For example, the cost value can specify the spatial distance between the ego motor vehicle and a road user. A high cost value can be characteristic for a low spatial distance and a low cost value can be characteristic for a high spatial distance with otherwise identical other influencing variables. The cost value can therefore, for example, represent the hazard potential for the ego motor vehicle.

In particular, the driving system is configured to ascertain the cost value as a function of at least one action option resulting in the respective possible future traffic situation, in particular as a function of a braking procedure and/or an acceleration procedure of the ego motor vehicle. For example, a high cost value can be characteristic for a change of the velocity of the motor vehicle which is large in absolute value. Alternatively thereto, a low cost value can be characteristic for a change of the velocity of the motor vehicle which is small in absolute value.

Alternatively or additionally, the cost value can also be characteristic, for example, for a change of the acceleration of the motor vehicle, wherein both a change of the sign of the acceleration acting on the ego motor vehicle and also the absolute value of the change of the acceleration can be taken into consideration. The cost value can therefore, for example, represent the driving comfort of the ego motor vehicle or can be dependent thereon.

In particular, the driving system is configured to ascertain the cost value as a function of the respective possible future traffic situation itself, in particular as a function of a collision of the ego motor vehicle with the road user in the respective possible future traffic situation. For example, a high cost value can be characteristic for a collision of the ego motor vehicle with a road user. This high cost value characteristic for collision can be, for example, greater by at least an order of magnitude than all other cost values without collision.

Alternatively or additionally, in particular a collision hazard between the ego motor vehicle and a road user can also be incorporated into the cost value. For example, a high cost value can be characteristic for a collision hazard, wherein the cost value for a collision hazard can be lower than the cost value for an actual collision.

In particular, the driving system is configured to determine each of these possible future traffic situations as a function of at least one possible movement of the road user.

A possible movement of the road user can be ascertained in particular as a function of the degrees of freedom of the road user. If the road user is a motor vehicle, for example, its movement options are thus limited, inter alia, by its maximum steering angle and its drive power. Alternatively thereto, if the road user is a pedestrian, its movement options are thus limited by its low movement velocity in comparison to motorized road users.

Due to the determination of possible future traffic situations as a function of at least one possible movement of the road user, in particular only actually possible future traffic situations are considered, which can really occur within the limits of physics.

Alternatively or additionally, a possible movement of the road user can in particular be ascertained as a function of the state of the road user itself. If the road user is, for example, a motor vehicle, it can thus be concluded from an activated direction indicator of the road user that and in which direction the road user will turn off.

The determination of each of these possible future traffic situations as a function of at least one possible movement of the road user is based in particular on the concept that thus the number of the possible future traffic situations can be reduced in comparison to the number of all theoretically possible future traffic situations. The selection according to embodiments of the invention of an action option relating to the longitudinal control of the ego motor vehicle can thus take place more efficiently.

In particular, the driving system is configured to ascertain, for each of these possible future traffic situations, a characteristic variable for the probability of occurrence of the respective possible future traffic situation, and to select the action option as a function thereof.

The probability of occurrence of the respective possible future traffic situation can be ascertained in particular as a function of the probabilities with which the road users change their spatial position and/or their state.

For example, in a traffic situation at a roundabout, the probability can be taken into consideration with which a motor vehicle as the road user leaves the roundabout at the next possible exit.

To determine this probability, for example, the spatial alignment of the motor vehicle can be evaluated. If the front of the motor vehicle is aligned in the direction of the next possible exit of the roundabout, the probability that the motor vehicle leaves the roundabout is thus, for example, higher than the probability that the motor vehicle does not leave the roundabout.

Alternatively or additionally, the probability of occurrence of the respective possible future traffic situation can be ascertained in particular as a function of the probabilities with which objects of the traffic infrastructure change their state.

For example, it can be assumed at a traffic signal that the probability for a state change increases in the course of time, the longer the present state of the traffic signal already exists.

The probability of occurrence of a traffic situation can in particular also be time-dependent. A possible future traffic situation can thus become more probable or less probable in the course of time. For example, a vehicle can move toward an intersection, in which the vehicle has multiple turnoff options. When the vehicle is still far away from the intersection, each turnoff option can thus be essentially equally probable. However, as soon the vehicle drives into the intersection and aligns itself in the direction of an exit of the intersection, this one turnoff option can thus be assumed to be more probable than the other remaining turnoff options.

In particular, the driving system is configured to use the characteristic variable for the probability of occurrence of the possible future traffic situation as a weighting factor for the assessment of the respective possible future traffic situation.

Therefore, in particular a first possible future traffic situation can be assessed more highly with a higher probability of occurrence in comparison to a second possible future traffic situation than the second possible future traffic situation, if the traffic situations otherwise have the same assessment.

In one advantageous embodiment, the probability of appearance for the virtual road user is dependent on the spatial size of the region in the surroundings of the motor vehicle which is not in the actual field of view of the at least one sensor.

For example, the probability of appearance can be determined as a function of an assumed traffic density, so that the probability of appearance results as the product of the spatial extension of the region in the surroundings of the motor vehicle, which is not in the actual field of view of the at least one sensor, and the assumed traffic density.

In a further advantageous embodiment, the driving system is configured, for at least one possible future traffic situation, to determine a virtual field of view of the at least one sensor of the motor vehicle in the possible future traffic situation, and, for at least one region in the surroundings of the motor vehicle, which is not in the virtual field of view of the at least one sensor, to simulate a virtual road user in the at least one region in the surroundings of the motor vehicle as a function of a probability of appearance for the virtual road user.

In particular, the driving system is configured to correlate the at least one region in the surroundings of the motor vehicle, which is not in the virtual field of view of the at least one sensor, with a region in the surroundings of the motor vehicle, which is not in the virtual field of view of the at least one sensor for another time step, or a region in the surroundings of the motor vehicle, which is not in the actual field of view of the at least one sensor.

In particular, the virtual road user can then be simulated in the at least one region in the surroundings of the motor vehicle as a function of a probability of appearance for the virtual road user if no virtual road user was simulated in the corresponding regions of other time steps.

In one advantageous embodiment, the driving system is configured to simulate the virtual road user in such a way that the front edge of the virtual road user in the travel direction of the virtual road user is located directly at an edge of the region in the surroundings of the motor vehicle which is not in the actual field of view of the at least one sensor.

In one advantageous embodiment, the driving system is configured to simulate the virtual road user in such a way that the length of the virtual road user along the longitudinal axis in the travel direction is assumed to be infinite.

This assumption can be implemented, for example, in that the length of the virtual road user along the longitudinal axis in the travel direction is selected to be very large, in particular significantly greater than in the case of a real road user. The length of the virtual road user along the longitudinal axis in the travel direction can thus be, for example, more than 10 m, 25 m, or 100 m.

In a further advantageous embodiment, the driving system is configured to determine the spatial position of the at least one virtual road user in a possible future traffic situation as a function of a constant velocity of the virtual road user.

In particular, the constant velocity of the virtual road user is higher than the highest velocity actually permitted in the respective possible future traffic situation. For example, the constant velocity of the virtual road user can be at least 120% or at least 130% of the actual permitted highest velocity.

In particular by combination of the advantageous embodiments that the driving system is configured to simulate the virtual road user in such a way that the length of the virtual road user along the longitudinal axis in the travel direction is assumed to be infinite, and that the constant velocity of the virtual road user is higher than the highest velocity actually permitted in the respective possible future traffic situation, the synergistic effect results that a valid "worst-case" consideration can be carried out.

The advantage of this "worst case" consideration is that therefore all possible states related to position and velocity of the virtual road user can be covered with respect to the position and velocity of the virtual road user relative to the region in the surroundings of the motor vehicle which is not in the field of view of the at least one sensor.

In a further advantageous embodiment, the driving system is configured, for at least one of these possible future traffic situations, to determine at least one action option relating to the longitudinal and/or lateral control of the ego motor vehicle starting from the respective possible future traffic situation for at least one second time step.

The at least one second time step follows the first time step here. In particular, there can also be more than only one second time step, wherein these further, following time steps are equivalent to the second time step. Therefore, only the second time step is explicitly mentioned in this document.

The at least one action option relating to the longitudinal control of the ego motor vehicle for the second time step can in particular be determined similarly to the action options for the first time step. The determination of the action option for the second time step can differ, for example, from the determination of the action option for the first time step in that instead of the actual traffic situation, a possible future traffic situation represents the starting situation for the determination.

For each of these action options for the second time step, at least one possible future traffic situation for the second time step is determined as a consequence of the respective action option for the second time step.

The possible future traffic situations for the at least one second time step can in particular be determined similarly to the possible future traffic situations for the first time step.

Because a possible future traffic situation for the second time step can thus be derived from a possible future traffic situation for the first time step, in particular a chain and/or a tree of successive possible future traffic situations can be generated.

The spatial position of the at least one virtual road user is determined in each possible future traffic situation for the second time step in such a way that the at least one virtual road user, starting from the spatial position of the at least one virtual road user, moves in the respective possible future traffic situation for the first time step similarly to a movement of the virtual road user between the actual traffic situation and the possible future traffic situation for the first time step.

For each of these possible future traffic situations for the second time step, an assessment is performed as a function of a possible virtual collision of the ego motor vehicle with the at least one virtual road user, in particular similarly to the performance of an assessment of the possible future traffic situations for the first time step.

An action option for the first time step is selected, for example, as a function of the assessments of the possible future traffic situations for the first time step and as a function of the assessments of the possible future traffic situations for the at least one second time step.

In particular the assessments of the possible future traffic situations for the first time step and the assessments of the possible future traffic situations for the second time step can be evaluated here as a function of the tree structure, in which all possible future traffic situations are linked to one another by use of action options.

For example, for each action option for the first time step, the sum of the values of the assessments of all possible future traffic situations can be determined, which can originate directly and/or indirectly from the action option. Resulting therefrom, the action option assessed best for a certain chronological horizon can be selected.

Alternatively, for example, for the first time step, the action option relating to the longitudinal control of the ego motor vehicle can also be selected, from which the best-assessed path in the tree structure of the possible future traffic situations begins.

In a further advantageous embodiment, the driving system is configured, for at least one possible future traffic situation for the second time step, to determine a virtual field of view of the at least one sensor of the motor vehicle in the possible future traffic situation, and for at least one region in the surroundings of the motor vehicle, which is not in the virtual field of view of the at least one sensor, to simulate a virtual road user in the at least one region in the surroundings of the motor vehicle as a function of a probability of appearance.

In a further advantageous embodiment, an action option relating to the longitudinal control of the ego motor vehicle is a reduction of the velocity of the ego motor vehicle. A reduction of the velocity of the motor vehicle can in particular result in a reduction of the hazard potential and, for example, a reduction of the risk of collision with other road users.

A second aspect of the invention relates to a method for automated driving for a motor vehicle.

One step of the method is the acquisition of an actual traffic situation in the surroundings of the motor vehicle.

A further step of the method is the determination of an actual field of view of at least one sensor of the motor vehicle in the actual traffic situation.

A further step of the method is the simulation of a virtual road user in the at least one region in the surroundings of the motor vehicle as a function of a probability of appearance for the virtual road user, for at least one region in the surroundings of the motor vehicle which is not in the actual field of view of the at least one sensor.

A further step of the method is the use of at least two alternative action options relating to the longitudinal and/or lateral control of the ego motor vehicle starting from the actual traffic situation for a first time step.

A further step of the method is the determination of at least one possible future traffic situation in each case for the first time step as a consequence of the respective action option for these action options.

A further step of the method is the determination of the spatial position of the at least one virtual road user in each possible future traffic situation in such a way that the at least one virtual road user moves starting from the spatial position of the at least one virtual road user in the actual traffic situation.

A further step of the method is the performance of an assessment for each of these possible future traffic situations as a function of a possible virtual collision of the ego motor vehicle with the at least one virtual road user.

A further step of the method is the selection of one of these action options as a function thereof for the first time step.

A further step of the method is the execution of the selected action option.

The above statements on the driving system according to the invention according to the first aspect of the invention also apply accordingly to the method according to the invention according to the second aspect of the invention. At this point and in the claims, advantageous exemplary embodiments of the method according to the invention according to the second aspect of the invention which are not explicitly described correspond to the advantageous exemplary embodiments of the driving system according to the invention according to the first aspect of the invention described above or described in the claims.

The invention is described hereinafter on the basis of an exemplary embodiment with the aid of the appended drawings.

DETAILED DESCRIPTION OF THE DRAWINGS

Figure 1:
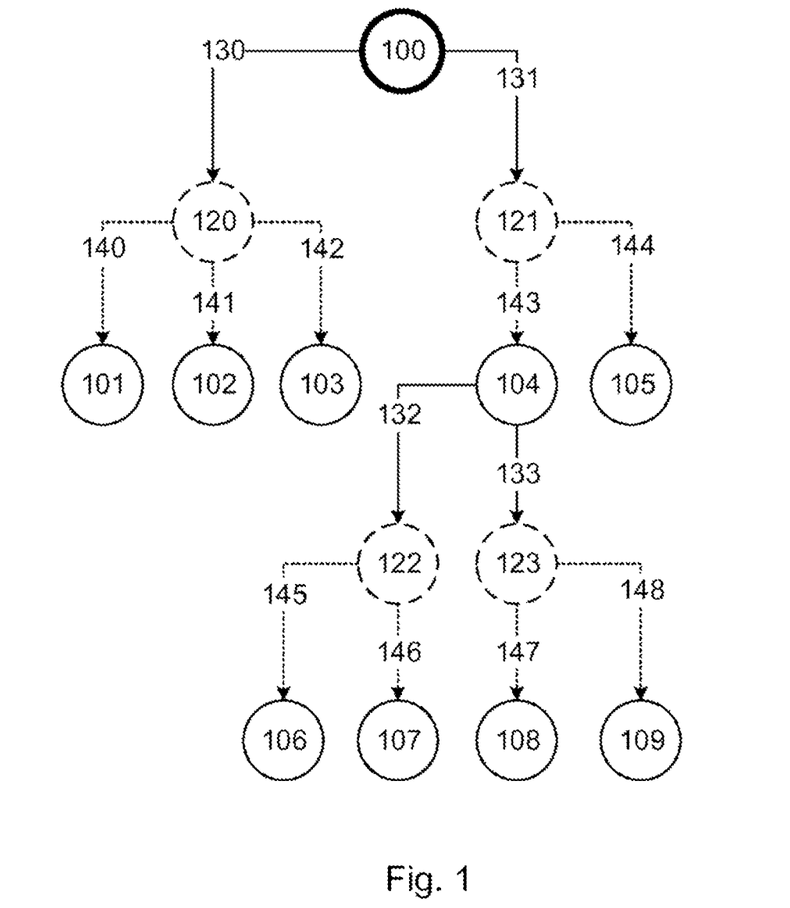
FIG. 1 shows an exemplary tree structure made up of traffic situations and action options.

FIG. 1 shows an exemplary tree structure made up of traffic situations 100-109 and action options 130-133.

The actual traffic situation 100 represents the root node of the tree structure. The actual traffic situation 100 describes, for example, the spatial position of an ego vehicle 300 and multiple additional road users 310, for example, other motor vehicles or pedestrians (cf. FIG. 3a for the positions).

Starting from the actual traffic situation 100, two different action options 130, 131 relating to the longitudinal control of the ego motor vehicle 300 are available to the ego motor vehicle 300 for a first time step. These action options can cause, for example, a change of the velocity of the motor vehicle 300, such as for example, an acceleration maneuver or a braking procedure.

If the ego motor vehicle 300 were to execute the action option 130, a traffic situation would not yet result solely therefrom, since a change of the spatial position of the additional road users 310 for the first time step cannot yet be concluded solely from the action option 130. For this reason, the exemplary tree structure comprises auxiliary nodes 120-123.

Starting from the auxiliary node 120, various assumptions 140-142 can be made for a change of the spatial position of the additional road users 310 for the first time step, for example, by use of a random process or by evaluation of the movement degrees of freedom of the additional road users 310. These assumptions can be interpreted, for example, as assumed, non-actual sensor values.

Based on the assumptions 140-142 for a change of the spatial position of the additional road users 310 and the action option 130 of the ego motor vehicle 300, various possible future traffic situations 101-103 result for the first time step.

If the ego motor vehicle 300 were to execute the action option 131, assumptions 143, 144 can also be made for a change of the spatial position of the additional road users 310. These assumptions 143, 144 can differ from the assumptions 140-142, for example, however, they can also be at least partially identical assumptions.

Based on the assumptions 143, 144 for a change of the spatial position of the additional road users 310 and the action option 131 of the ego motor vehicle 300, various possible future traffic situations 104, 105 result for the first time step.

For a second time step following the first time step, two action options 132, 133 are again available to the ego motor vehicle 300, for example, starting from the possible future traffic situation 104.

If the ego motor vehicle 300 were to execute the action option 132 in the second time step, assumptions 145, 146 can again be made on the basis of the possible future traffic situation 104 for the first time step for a change of the spatial position of the additional road users 310 for the second time step.

Based on the assumptions 145, 146 for a change of the spatial position of the additional road users 310 and the action option 132 of the ego motor vehicle 300, various possible future traffic situations 106, 107 result for the second time step. If the ego motor vehicle 300 were to execute the action option 133 in the second time step, assumptions 147, 148 can also be made on the basis of the possible future traffic situation 104 for the first time step for a change of the spatial position of the additional road users 310 for the second time step.

Based on the assumptions 147, 148 for a change of the spatial position of the additional road users 310 and the action option 133 of the ego motor vehicle 300, various possible future traffic situations 108, 109 result for the second time step.

Figure 2:
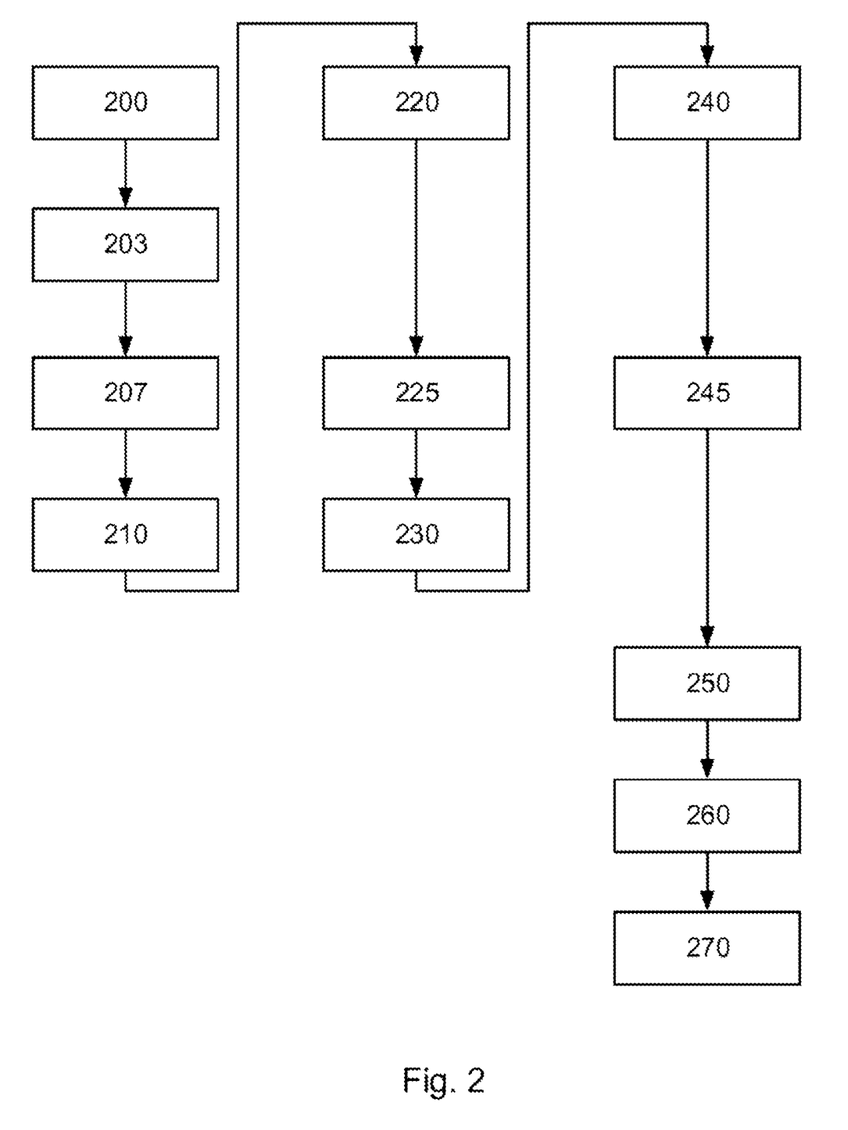
FIG. 2 shows an exemplary flow chart of the functionality of the driving system according to the invention.

FIG. 2 shows an exemplary flow chart for the functionality of the driving system according to the invention.

In step 200, an actual traffic situation 100 in the surroundings of the ego motor vehicle 300 is acquired, for example, by use of the sensors of the ego motor vehicle 300.

In step 203, an actual field of view FOV of at least one sensor of the motor vehicle 300 is determined in the actual traffic situation 100.

The field of view of the at least one sensor fundamentally results here from the design of the sensor and is restricted by objects 400 in the surroundings of the motor vehicle, for example, by static or dynamic objects 400 in the surroundings of the motor vehicle.

Subsequently, in step 207, a virtual road user 401 is simulated in the at least one region OC1-OC2 in the surroundings of the motor vehicle 300 as a function of a probability of appearance for the virtual road user 300, for at least one region OC1-OC2 in the surroundings of the motor vehicle 300, which is not in the actual field of view FOV of the at least one sensor.

On the basis of the actual traffic situation 100, in step 210, at least two alternative action options 130, 131 relating to the longitudinal control of the ego motor vehicle 300 are used for a first time step. These can be selected, for example, from a predetermined set of possible action options.

These action options can be, for example, an increase 130 of the velocity of the ego motor vehicle 300 and a reduction 131 of the velocity of the ego motor vehicle 300.

For each of these action options, in step 220, possible future traffic situations 101-105 are determined for the first time step. The possible future traffic situations 101-105, which are associated with an action option 130, 131, can each in particular describe various spatial positions of the other road users 310.

The spatial positions of the other road users 310 can be ascertained here in particular in that possible, observable movements of the other road users 310 are assumed. For example, if a road user 310 is located in a roundabout, possible, observable movements of this road user 310 are thus the leaving 144 of the roundabout at the next exit or the remaining 143 in the roundabout. Of these two possible, observable movements 143, 144, for example, each can be comprised by one possible future traffic situation 104, 105.

In step 225, the spatial position of the at least one virtual road user 401 is determined in each possible future traffic situation 101-105 in such a way that the at least one virtual road user 401 moves starting from the spatial position of the at least one virtual road user 401 in the actual traffic situation 100.

In following step 230, action options 132, 133 relating to the longitudinal control of the ego motor vehicle 300 are used for a second time step. These action options 132, 133 are based here, for example, on a possible future traffic situation 104 of the first time step.

For each of these action options 132, 133, in step 240, similarly to step 220, possible future traffic situations 106-109 are determined on the basis of possible, observable movements 145-148 of the other road users 310.

In step 245, the spatial position of the at least one virtual road user 401 is determined in each possible future traffic situation 108-109 for the second time step in such a way that the at least one virtual road user 401 moves starting from the spatial position of the at least one virtual road user 401 in the respective possible future traffic situation 101-105 for the first time step.

In step 250, all possible future traffic situations 101-109 are assessed, wherein in this case both the possible future traffic situations 101-105 of the first time step, and also the possible future traffic situations 106-109 of the second time step are assessed.

In this assessment, in particular properties of the possible future traffic situations 101-109 can be incorporated, such as for example, the distance of the ego vehicle 300 to the other road users 310. Since a large distance of the ego vehicle 300 to the other road users 310 can be interpreted as a very safe state, a large distance can be assessed comparatively positively. In contrast thereto, for example, a collision of the ego motor vehicle 300 with a road user 310 can be assessed comparatively negatively.

If the assessment is carried out, for example, by use of a cost function, the cost value can thus be contrary to the distance of the ego motor vehicle 300 to the other road users 310, for example. A large distance therefore results in a small cost value. A collision of the ego motor vehicle 300 with a road user 310 can result in a very high cost value in this case, for example.

Alternatively or additionally, the action options 130-133 resulting in the respective future traffic situation 101-109 can also be incorporated into this assessment. In particular, for this purpose the influence of an action option 130-133 on the driving comfort of the ego motor vehicle 300 can be determined. For example, a large change in absolute value of the velocity of the ego motor vehicle 300 is to be assessed rather negatively with respect to the driving comfort. For example, in this case a comparatively high cost value can be incorporated into the assessment of the possible future traffic situation 101-109. Alternatively thereto, in the case of a small change in absolute value of the velocity of the ego motor vehicle 300, only a comparatively small cost value can be incorporated into the assessment of the possible future traffic situation 101-109.

Alternatively or additionally, in particular the probability of occurrence of a possible future traffic situation 101-109 can also be incorporated into the assessment of the possible future traffic situation 101-109, for example in the form of a weighting factor. The circumstance can thus be taken into consideration that a very probable possible future traffic situation 101-109 can have a greater influence on the selection of an action option 130, 131 than a rather improbable possible future traffic situation 101-109.

In step 260, an action option 130, 131 for the first time step is selected as a function of step 250. For this purpose, in particular for each action option 130, 131, the assessments of the possible future traffic situations to be attributed to the action option 130, 131 can be combined. For example, for a first action option 130, the assessments of the possible future traffic situations 101-103 which can be attributed to the first action option can be summed. For a second action option 131, the assessments of the possible future traffic situations 104-109 which can be attributed to the second action option can also be summed.

If the assessments are, for example, cost values, for the first time step, the action option 130, 131 can thus be selected which has the smallest summed cost value.

In particular if a collision of the ego motor vehicle 300 with the further road user 310 can occur in a selected possible future traffic situation 107, this can have a large influence on the selection of the action option 130, 131 relating to the longitudinal control of the ego motor vehicle 300. For example, if a very high cost value is associated with a possible future traffic situation 107 because of the collision, which is greater by at least an order of magnitude than the cost values of all other possible future traffic situations 101-106, 108, 109, the selection of the action option 131, which can result in the selected possible future traffic situation 107, thus becomes very improbable.

In particular, this implicitly has the result that the driving system according to embodiments of the invention selects action options 130, 131 which are comparatively cautious and/or reduce the velocity of the ego motor vehicle 300 if at least one possible future traffic situation 107 is located in the tree structure, in which a collision of the ego motor vehicle 300 with a further road user 310 is possible.

An action option 130, 131 reducing the velocity of the ego motor vehicle 300 in turn has the effect, for example, that the duration until the possible, actual occurrence of the collision lengthens, whereby more time is in turn obtained for a more exact determination of the actual behavior of the further road user 310.

In step 270, the action option 130, 131 selected in step 260 is executed for the first time step. The longitudinal control of the ego motor vehicle 300 is influenced in the way specified by the selected action option 130, 131. For example, the velocity of the ego motor vehicle 300 can be increased 130 or decreased 131.

As soon the second time step actually occurs, the driving system according to embodiments of the invention can be executed again in particular beginning with step 200, wherein the actual traffic situation 100 has obviously changed in the meantime. Alternatively or additionally, however, at least intermediate results of individual sequence steps for the first time step can also be stored in a memory component which the driving system comprises and can be reused upon the renewed execution of the driving system in the actual, second time step.

Figure 3A:
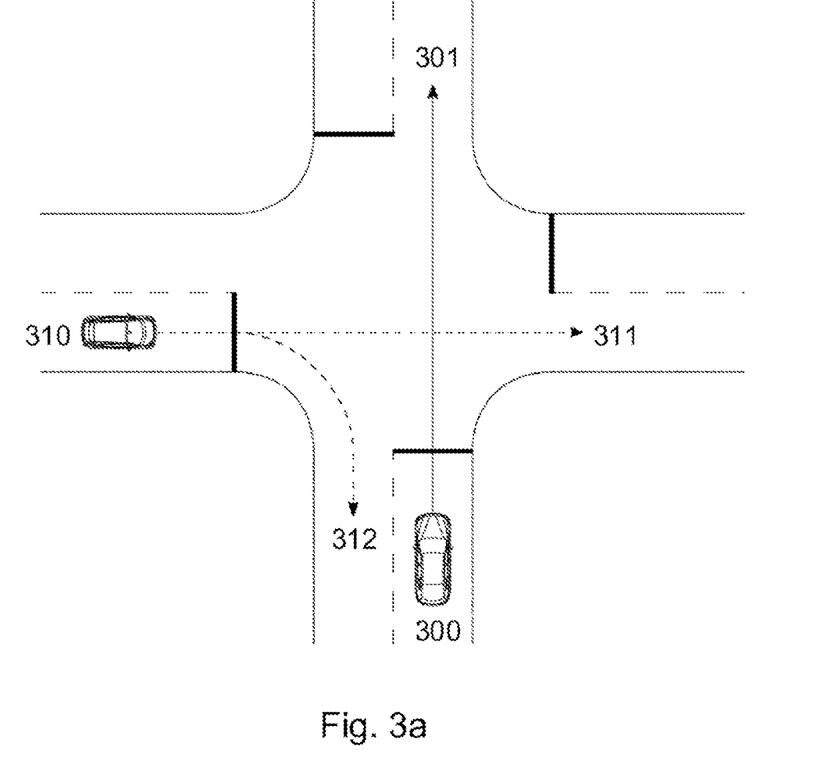
FIG. 3a shows an exemplary traffic situation having a further road user.

FIG. 3a shows an exemplary traffic situation to illustrate the driving system according to the invention.

The ego motor vehicle 300 is located here in front of an intersection, into which a vehicle 310 drives from the left as a further road user.

The ego motor vehicle 300 plans, for example, to traverse the intersection on the path 301, whereas it is not unambiguously determinable for the ego motor vehicle 300 whether the further road user 310 will traverse the intersection on the path 311 or whether the further road user 310 will turn off to the right on the path 312.

Figure 3B:
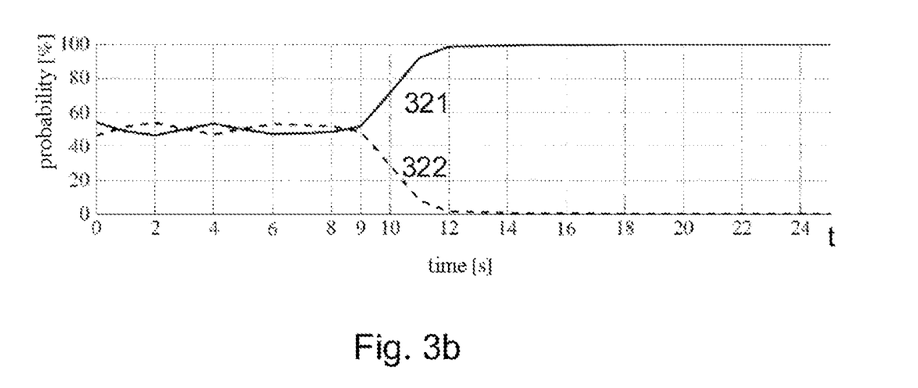
FIG. 3b show exemplary curves of probabilities.

FIG. 3b shows an exemplary time curve of probabilities assessable by the driving system according to the invention. The curve 321 indicates the time-dependent probability that the further road user 310 traverses the intersection in a straight line on the path 311 and the curve 322 indicates the time-dependent probability that the further road user 310 turns off to the right on the path 312. In the course of the time plotted on the abscissa, the probabilities assessable by the driving system change in such a way that up to a point in time t=9 s, the two possible movement paths 311, 312 for the further road user 310 appear to be essentially equally probable. From the point in time t=9 s, the probability 321 rapidly rises that the further road user 310 decides for the path 311 traversing the intersection.

One reason for this can be, for example, that the further road user 310 is already located very close to the intersection and has still not yet activated a directional indicator or his behavior has to be recognizable on the basis of the progress of the situation. It can be concluded therefrom that the further road user 310 wishes to drive straight ahead.

The movement path 311 of the road user 310 which directly traverses the intersection can result in a possible future traffic situation 107 in which a collision of the ego motor vehicle 300 with the road user 310 threatens.

Since this possible future traffic situation 107 has, for example, a very high cost value, the driving system according to embodiments of the invention will tend to select 260 an action option 130, 131 with high probability up to the point in time t=9 s, which cannot result in this possible future traffic situation 107. These action options 130, 131 tend to be action options 130, 131 which at least do not increase the velocity of the motor vehicle 300. In particular, these are action options 130, 131 which reduce the velocity of the motor vehicle 300 to produce a waiting behavior until further action options become obvious.

Figure 4:
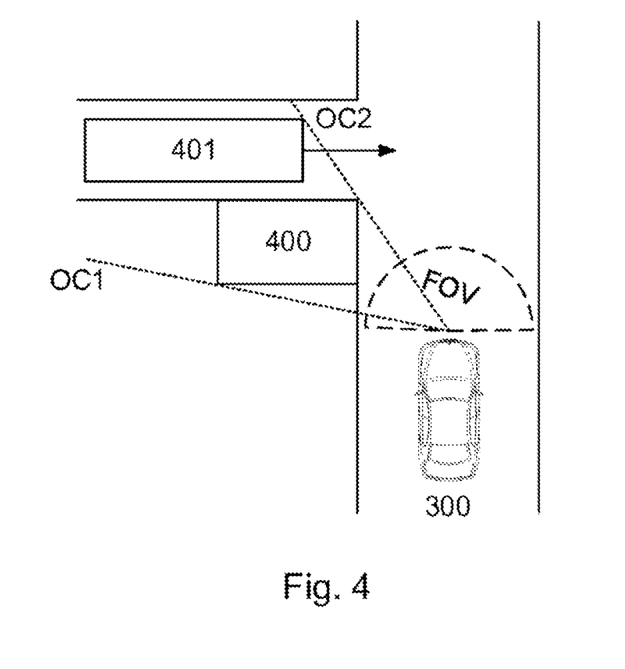
FIG. 4 shows an exemplary traffic situation having a virtual road user.

FIG. 4 shows an exemplary traffic situation with a virtual road user.

The ego motor vehicle 300 is located as the actual traffic situation (100) in front of a junction, thus the meeting of a road with a through road without continuation beyond it.

The driving system according to embodiments of the invention for automated driving of the motor vehicle 300 is configured here to acquire 200 this actual traffic situation 100 in the surroundings of the motor vehicle 300 and to determine an actual field of view FOV of at least one sensor of the motor vehicle 300 in the actual traffic situation 100.

An object 400 at the road edge restricts the field of view FOV of the at least one sensor in this case.

The driving system is therefore configured, for at least one region OC1-OC2 in the surroundings of the motor vehicle 300, which is not in the actual field of view FOV of the at least one sensor, to simulate a virtual road user 401 in the at least one region in the surroundings of the motor vehicle 300 as a function of a probability of appearance for the virtual road user 401.

In addition, the driving system is configured to use 210 at least two alternative action options 130, 131 relating to the longitudinal and/or lateral control of the ego motor vehicle 300 starting from the actual traffic situation 100 for a first time step, for example maintaining the velocity or reducing the velocity.

For each of these action options 130, 131, the driving system determines at least one possible future traffic situation 101-105 for the first time step as a consequence of the respective action option 130, 131.

In addition, the driving system is configured to determine the spatial position of the at least one virtual road user 401 in each possible future traffic situation 101-105 in such a way that the at least one virtual road user 401 moves starting from the spatial position of the at least one virtual road user 401 in the actual traffic situation 100.

For example, the virtual road user can move toward the junction at constant velocity.

The driving system is therefore configured to perform 250 an assessment for each of these possible future traffic situations 101-105 as a function of a possible virtual collision of the ego motor vehicle 300 with the at least one virtual road user 401.

For example, in this case the possible virtual traffic situation which results from maintaining the velocity can be assessed "worse" than the possible virtual traffic situation which results from a reduction of the velocity, because the risk of a collision of the motor vehicle 300 with the virtual road user 401 is higher in this case.

The driving system selects 260 one of these action options 130, 131 as a function thereof for the first time step, and executes 270 the selected action option 130, 131.

For example, the driving system selects the action option 130, 131 which results in the "better" assessed possible virtual traffic situation.

Due to the continuous, chronologically clocked repetition of this procedure, for example, the velocity of the motor vehicle 300 is reduced by the required amount to prevent a collision of the motor vehicle 300 with an actual further road user, who is possibly in the at least one region OC1-OC2 in the surroundings of the motor vehicle 300, which is not in the actual field of view FOV of the at least one sensor.

However, the velocity of the motor vehicle 300 is not reduced beyond the required extent, since in the course of things the region OC1-OC2 is reduced in size by the progressing movement of the motor vehicle 300, whereby the risk of collision of the motor vehicle 300 with the virtual road user 401 sinks, whereby, for example, the action option which does not reduce the velocity of the motor vehicle is assessed "better". This can result in particular in that further criteria are taken into consideration in the assessment, in particular a deviation of the velocity of the motor vehicle 300 from a target velocity. For example, a deviation of the velocity of the motor vehicle 300 from a target velocity can be incorporated negatively into the assessment, which has the result that the motor vehicle 300, if there is no or only a minor risk of a collision of the motor vehicle 300 with the virtual road user 401, will attempt to reach the target velocity.

What is claimed is:

1. A driving system for automated driving for a motor vehicle, wherein the driving system is configured:
   to acquire an actual traffic situation in surroundings of the motor vehicle,
   to determine an actual field of view of at least one sensor of the motor vehicle in the actual traffic situation,
   for at least one region in the surroundings of the motor vehicle, which is not in the actual field of view of the at least one sensor, to simulate a virtual road user in the at least one region in the surroundings of the motor vehicle as a function of a probability of appearance for the virtual road user,
   to use at least two alternative action options relating to at least one of longitudinal control or lateral control of the motor vehicle starting from the actual traffic situation for a first time step,
   for each of the at least two alternative action options, to determine at least one possible future traffic situation for the first time step as a consequence of the respective action option,
   to determine a spatial position of the virtual road user in each possible future traffic situation such that the virtual road user moves starting from the spatial position of the virtual road user in the actual traffic situation,
   to perform an assessment for each possible future traffic situation as a function of a possible virtual collision of the motor vehicle with the virtual road user, to select one of the at least two alternative action options as a function of the assessment thereof for the first time step, and to execute the selected action option such that a motion of the vehicle is changed, wherein the driving system is further configured:

for at least one of the possible future traffic situations, for the first time step, to determine one or more action options relating to at least one of the longitudinal control or the lateral control of the motor vehicle starting from the respective possible future traffic situation for at least one second time step, for each of the action options for the second time step, to determine at least one possible future traffic situation for the second time step as a consequence of the respective action option for the second time step, to determine the spatial position of the virtual road user in each possible future traffic situation for the second time step such that the virtual road user moves starting from the spatial position of the virtual road user in the respective possible future traffic situation for the first time step, for each of the possible future traffic situations for the second time step, to perform an assessment as a function of a possible virtual collision of the motor vehicle with the virtual road user, and to select one of the action options for the first time step as a function of the assessments of the possible future traffic situations for the first time step and as a function of the assessments of the possible future traffic situations for the at least one second time step.

2. The driving system according to claim 1, wherein the probability of appearance for the virtual road user is dependent on a spatial size of the at least one region in the surroundings of the motor vehicle, which is not in the actual field of view of the at least one sensor.

3. The driving system according to claim 1, wherein the driving system is further configured:

for at least one of the possible future traffic situations, to determine a virtual field of view of the at least one sensor of the motor vehicle in the possible future traffic situation, and for at least one region in the surroundings of the motor vehicle, which is not in the virtual field of view of the at least one sensor, to simulate the virtual road user in the at least one region in the surroundings of the motor vehicle as a function of the probability of appearance for the virtual road user.

4. The driving system according to claim 1, wherein the driving system is further configured to simulate the virtual road user such that a front edge of the virtual road user in a travel direction of the virtual road user is located directly at an edge of the region in the surroundings of the motor vehicle, which is not in the actual field of view of the at least one sensor.

5. The driving system according to claim 4, wherein the driving system is further configured to simulate the virtual road user such that a length of the virtual road user along a longitudinal axis in the travel direction is assumed to be infinite.

6. The driving system according to claim 1, wherein the driving system is further configured to determine the spatial position of the virtual road user in one of the possible future traffic situations as a function of a constant velocity of the virtual road user.

7. The driving system according to claim 6, wherein the constant velocity of the virtual road user is higher than a highest velocity actually permitted in the respective possible future traffic situation.

8. The driving system according to claim 1, wherein the driving system is further configured:

for at least one of the possible future traffic situations for the second time step, to determine a virtual field of view of the at least one sensor of the motor vehicle in the possible future traffic situation, and for at least one region in the surroundings of the motor vehicle, which is not in the virtual field of view of the at least one sensor, to simulate the virtual road user in the at least one region in the surroundings of the motor vehicle as a function of a probability of appearance.

9. The driving system according to claim 1, wherein an action option relating to the longitudinal control of the motor vehicle is a reduction of a velocity of the motor vehicle.

10. A method for automated driving for a motor vehicle, the method comprising:

acquiring an actual traffic situation in surroundings of the motor vehicle, determining an actual field of view of at least one sensor of the motor vehicle in the actual traffic situation, simulating a virtual road user in at least one region in the surroundings of the motor vehicle as a function of a probability of appearance for the virtual road user, wherein the at least one region in the surroundings of the motor vehicle is not in the actual field of view of the at least one sensor, using at least two alternative action options relating to at least one of a longitudinal control or a lateral control of the motor vehicle starting from the actual traffic situation for a first time step, for each of the at least two alternative action options, determining at least one possible future traffic situation for the first time step as a consequence of the respective action option, determining a spatial position of the virtual road user in each possible future traffic situation such that the virtual road user moves starting from the spatial position of the virtual road user in the actual traffic situation, performing an assessment for each possible future traffic situation as a function of a possible virtual collision of the motor vehicle with the virtual road user, selecting one of the at least two alternative action options as a function of the assessment for the first time step, and executing the selected action option such that a motion of the vehicle is changed, the method further comprising:

for at least one of the possible future traffic situations, for the first time step, determining one or more action options relating to at least one of the longitudinal control or the lateral control of the motor vehicle starting from the respective possible future traffic situation for at least one second time step, for each of the action options for the second time step, determining at least one possible future traffic situation for the second time step as a consequence of the respective action option for the second time step, determining the spatial position of the virtual road user in each possible future traffic situation for the second time step such that the virtual road user moves starting from the spatial position of the virtual road user in the respective possible future traffic situation for the first time step, for each of the possible future traffic situations for the second time step, performing an assessment as a function of a possible virtual collision of the motor vehicle with the virtual road user, and selecting one of the action options for the first time step as a function of the assessments of the possible future traffic situations for the first time step and as a function of the assessments of the possible future traffic situations for the at least one second time step.

\* \* \* \* \*